United States Patent [19]

Cohn et al.

[11] Patent Number: 4,512,715
[45] Date of Patent: Apr. 23, 1985

[54] METHOD AND MEANS FOR RECAPTURING COOLANT IN A GAS TURBINE

[75] Inventors: Arthur Cohn, Palo Alto; Robert B. Schainker, Woodside, both of Calif.

[73] Assignee: Electric Power Research Institute, Inc., Palo Alto, Calif.

[21] Appl. No.: 403,162

[22] Filed: Jul. 29, 1982

Related U.S. Application Data

[63] Continuation of Ser. No. 171,131, Jul. 22, 1980, abandoned.

[51] Int. Cl.³ .................................................. F02C 7/12
[52] U.S. Cl. .................................... 415/168; 415/117; 415/121 A; 415/175; 415/209; 415/DIG. 1; 415/144; 416/95; 416/97 R
[58] Field of Search ............... 415/114, 115, 121 A, 415/168, 144, 116, 117, 175, 209, DIG. 1, 219 R; 416/95, 97 R

[56] References Cited

U.S. PATENT DOCUMENTS

| | | | |
|---|---|---|---|
| 1,834,452 | 12/1931 | Frey et al. | 415/168 |
| 1,944,520 | 1/1934 | Meyer | 415/144 |
| 3,446,481 | 5/1969 | Kydd | 416/95 |
| 3,632,223 | 1/1972 | Hampton | 415/144 |
| 3,804,551 | 4/1974 | Moore | 416/97 R |
| 3,806,275 | 4/1974 | Aspinwall | 416/97 R |
| 3,816,022 | 6/1974 | Day | 416/97 R |
| 4,157,880 | 6/1979 | Klompas | 415/115 |
| 4,158,526 | 6/1979 | Gerhold | 416/95 |

FOREIGN PATENT DOCUMENTS

| | | | |
|---|---|---|---|
| 616473 | 7/1935 | Fed. Rep. of Germany | 415/144 |
| 53-1711 | 10/1978 | Japan | 416/97 R |
| 510583 | 6/1976 | U.S.S.R. | 415/121 A |
| 775396 | 10/1980 | U.S.S.R. | 415/121 A |

*Primary Examiner*—Samuel Scott
*Assistant Examiner*—Brian J. Bowman
*Attorney, Agent, or Firm*—Flehr, Hohbach, Test, Albritton & Herbert

[57] ABSTRACT

An open circuit liquid cooled gas turbine in which a coolant passes through the turbine blades and is expelled at the tips thereof. The coolant is recaptured by providing ports in the turbine casing in radial alignment with the turbine blades whereby fluid expelled radially is received by the ports. A trough is provided in the turbine casing axially displaced downstream from the turbine blades to recapture coolant that is blown by the ports due to the differential pressure in the turbine.

5 Claims, 3 Drawing Figures

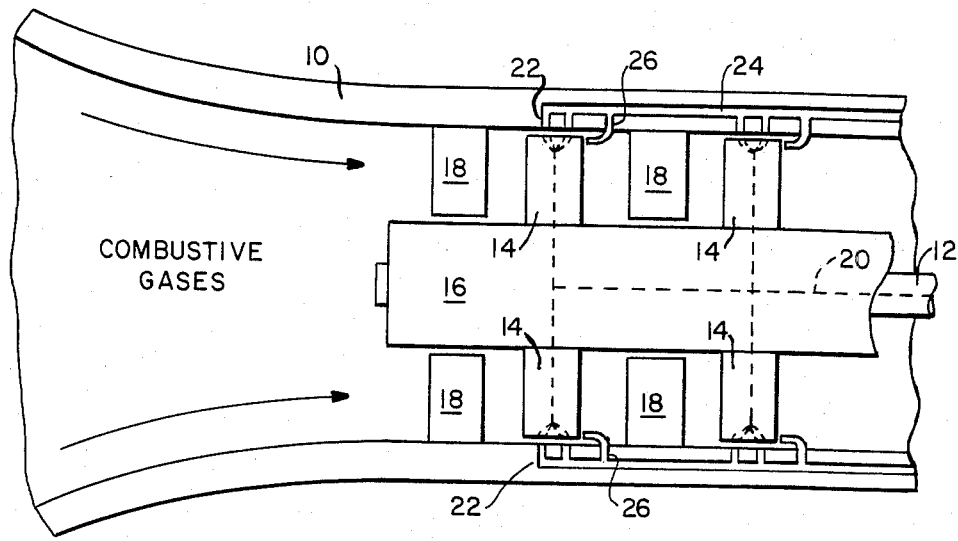
FIG.—1
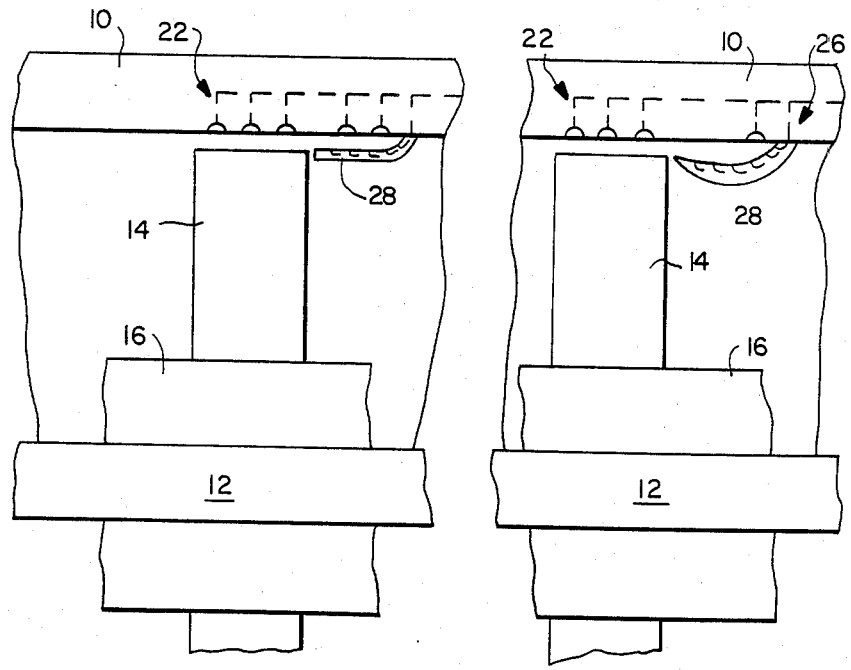
FIG.—2  FIG.—3

METHOD AND MEANS FOR RECAPTURING COOLANT IN A GAS TURBINE

This is a continuation of application Ser. No. 171,131 filed July 22, 1980, now abandoned.

This invention relates generally to open circuit liquid cooled gas turbines, and more particularly the invention relates to improvements in the method and means of recapturing the liquid coolant in such a gas turbine.

Gas turbine apparatus as employed in jet engines and in electric power generation systems comprises a rotating shaft having a plurality of rotating blades mounted thereon. Surrounding the rotor and blades is a casing for confining and directing the flow of a motive fluid such as combustion gases past the blades and thereby rotating the shaft. Gas turbines can be employed as single cycle engines or in combined cycles with steam turbines to improve operating efficiency. In combined cycle systems, the gas turbine exhaust is utilized in forming steam for the steam turbine.

Gas turbines operating at a temperature greater than 1500° F. provide more power and achieve greater thermal efficiency than lower temperature gas turbines. In operating such gas turbines in this temperature range, using the usual alloys for the blading, the blading must be cooled. Liquid cooling of the turbine blades may be employed. In an open circuit liquid cooling system a coolant such as water is passed through the blades and is ejected at the tips of the blades.

Conventionally, the ejected liquid coolant is captured by providing a plurality of liquid receptive ports in the turbine casing in radial alignment with the blades whereby the liquid coolant is recaptured.

The technical and commercial effectiveness of liquid cooled gas turbines depends critically on the amount of liquid coolant recovered in the cooling process. In present designs maximum liquid recovery efficiency is about 50% and typically is on the order of 35%. However, in test runs of such turbine apparatus a recovery efficiency above 90% has been achieved where there was no pressure drop across the blade tips, i.e. a motive fluid was not utilized in rotating the shaft and blades. Accordingly, the drop in efficiency of liquid coolant recapture appears to be the result of pressure drop across the blade tips resulting in blow by of coolant due to the axial flow of the motive fluid.

An object of the invention is a method of more efficiently recapturing the liquid coolant ejected from the blades of a gas turbine.

Another object of the present invention is a more efficient gas turbine with liquid cooled rotor blades.

Still another object of the invention is means for recapturing coolant fluid which is ejected from gas turbine blades.

Yet another object of the invention is to minimize the amount of water carried downstream and thereby minimizing erosion of downstream turbine parts.

A feature of the invention is the provision of a trough in the turbine casing axially displaced from the blades of the turbine whereby ejected liquid carried downstream by the motive fluid is recaptured.

Another feature of the invention is annular trough provided in a turbine casing in which the downstream wall of the trough extends inwardly from the casing wall in general radial alignment with the tips of turbine blades whereby the recapture of ejected liquid is facilitated.

The invention and objects and features thereof will be more readily apparent from the following detailed description and appended claims when taken with the drawing, in which:

FIG. 1 is a schematic side view in section of a gas turbine in accordance with one embodiment of the invention.

FIG. 2 is a schematic view in section further illustrating the coolant recovery system of FIG. 1.

FIG. 3 is a schematic view in section illustrating another embodiment of the coolant recovery system of FIG. 1.

Referring now to the drawings, FIG. 1 is a schematic side view in section of a gas turbine in accordance with one embodiment of the invention. The turbine includes a casing 10 which defines a cylindrical housing for the turbine shaft 12 on which is mounted a plurality of blades 14 by means of a disc assembly 16, all in accordance with a conventional gas turbine technology. Depending from casing 10 are a plurality of stators 18 which together with the rotor blades define stages of the turbine. For example, in one stage the stator provides a nozzle for directing and speeding up the flow of combustive gases for optimum engagement with the adjacent downstream rotor blades 14.

As above described, in the high temperature gas turbine the blades 14 must be cooled to withstand the high temperature operating environment. In an open liquid cooled system the coolant is provided by means of liquid flow through passages 20 in the shaft and mounting discs and in each of the blades 14 with the coolant ejected at the tips of the blades being captured by ports 22 in casing 10. The coolant ejected by the blades is directed by pressure differential to the ports 22 which transfers the captured coolant through a transmission line 24 to an external reservoir (not shown) which is at a lower pressure than the gas pressure within the tube casing.

In accordance with the present invention the efficiency in recapture of the coolant in a liquid cooled turbine is increased by providing recapture trough means 26 in the casing and axially displaced downstream from the blades whereby ejected liquid carried downstream by the motive fluid is captured. As further illustrated in FIG. 2, the trough means 26 includes an annular wall 28 extending inwardly from the casing in general radial alignment with the tips of the blades 14 whereby capture of the blow-by ejected fluid is facilitated.

FIG. 3 is a section view similar to FIG. 2 in which the annular wall 28 is shaped to minimize aerodynamic drag on the combustive gases. It will be appreciated that the exact shape of the trough can be any of a number of designs to maximize coolant recapture and minimize interference with the gas flow. The thickness of each trough should be as thin as mechanically possible to minimize blockage; however, for illustration purposes the troughs are shown relatively thick. The trough may be provided with liquid receptive ports, as shown, or the ports may be provided only in the casing. Further, the troughs may be designed as part of the downstream stator blade assemblies 18.

By providing a coolant recovery system both radially aligned and axially displaced with respect to the tips of turbine and blades, enhanced coolant recapture is facilitated and increased turbine efficiency is realized. While the invention has been described with respect to specific embodiments, the description is illustrative of the invention and is not to be construed as limiting the invention. Various modifications and applications may occur to those skilled in the art without departing from the true spirit and scope of the invention as defined by the appended claims.

What is claimed is:

1. A gas turbine comprising a rotary shaft, a plurality of blades mounted on said shaft, a casing surrounding said blades and shaft for confining and directing the flow of a motive fluid past said blades, means for transmitting a liquid coolant through said blades and ejecting said liquid from the ends of said blades, liquid receptive ports in said casing in radial alignment with said blades whereby liquid ejected radially from said blades is captured by said ports, and trough-means in said casing axially displaced from said blades and protruding from said casing so to be positioned to capture liquid coolant entrained in the blow-by gases that flow between the blade tips and the casing wall, said trough means including an annular wall extending inwardly from said casing in general radial alignment with the tips of said blades whereby capture of ejected liquid is facilitated.

2. In a liquid cooled gas turbine in which turbine blades are cooled by an open circuit liquid flow, apparatus for capturing liquid coolant ejected by said blades comprising a trough in the turbine casing axially displaced from said blades and protruding from said casing so to be positioned to capture the coolant entrained in the blow-by gases that flow between the blade tips and the casing wall, and liquid receptive ports in the turbine casing in radial alignment with said blades and axially displaced from said blades whereby ejected liquid is captured by said ports.

3. Apparatus for capturing liquid coolant as defined by claim 2 wherein said trough includes an annular wall projecting inwardly from said turbine casing towards the tips of said blades whereby capture of ejected fluid is facilitated.

4. In a liquid cooled gas turbine in which turbine blades are cooled by an open circuit liquid flow through said blades, the method of capturing liquid coolant ejected from said blades including the steps of providing trough-means in said turbine casing axially displaced from said blades and protruding from said casing so to be positioned to capture the coolant entrained in the blow-by gases that flow between the blade tips and the casing wall, and providing liquid receptive ports in the turbine casing in radial alignment with said blades and axially displaced from said blades whereby ejected liquid is captured by said ports.

5. The method of capturing liquid coolant as defined by claim 4 wherein said step of providing trough means includes displacing the downstream wall of said trough inwardly in generally radial alignment with the tips of the said blades whereby capture of ejected fluid is facilitated.

* * * * *